(12) United States Patent
Funami et al.

(10) Patent No.: US 11,489,239 B2
(45) Date of Patent: Nov. 1, 2022

(54) CYLINDRICAL BATTERY AND METHOD OF MANUFACTURE THEREOF

(71) Applicant: Panasonic Intellectual Property Management Co., Ltd., Osaka (JP)

(72) Inventors: Koji Funami, Kyoto (JP); Izuru Nakai, Osaka (JP); Kazumichi Shimizu, Osaka (JP); Hiroshi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 16/656,121

(22) Filed: Oct. 17, 2019

(65) Prior Publication Data

US 2020/0176750 A1 Jun. 4, 2020

(30) Foreign Application Priority Data

Nov. 29, 2018 (JP) .............................. JP2018-224066

(51) Int. Cl.
*H01M 50/538* (2021.01)
*H01M 10/04* (2006.01)

(52) U.S. Cl.
CPC ..... *H01M 50/538* (2021.01); *H01M 10/0422* (2013.01); *H01M 10/0431* (2013.01)

(58) Field of Classification Search
CPC ........... H01M 50/538; H01M 10/0431; H01M 10/0422; H01M 50/107; H01M 50/116; H01M 50/155; H01M 50/172; H01M 50/463; H01M 10/0468; H01M 10/0587
See application file for complete search history.

(56) References Cited

U.S. PATENT DOCUMENTS

| 2003/0175587 | A1  | 9/2003 | Okutani et al. |
| 2013/0149579 | A1* | 6/2013 | Park ................... H01M 10/0431 |
|              |     |        | 429/94 |
| 2014/0038005 | A1* | 2/2014 | Yamato ............... H01M 50/166 |
|              |     |        | 429/57 |

(Continued)

FOREIGN PATENT DOCUMENTS

| JP | 58-082773  | 6/1983 |
| JP | 2003-272597 | 9/2003 |

(Continued)

*Primary Examiner* — Cynthia H Kelly
*Assistant Examiner* — Jenna Shulman
(74) *Attorney, Agent, or Firm* — Wenderoth, Lind & Ponack, L.L.P.

(57) ABSTRACT

A cylindrical battery includes an electrode unit configured as a roll of a first electrode plate and a second electrode plate with a separator in between. The first electrode plate is an electrode plate to which one end of a first electrode tab and one end of a second electrode tab are connected, and the second electrode plate has the opposite polarity from the first electrode plate. Additionally, a case houses the electrode unit and a sealing member seals an opening rim of the case. The first electrode tab and the second electrode tab are disposed to project out from the first electrode plate at opposite ends of a winding axis of the first electrode plate. The first electrode tab contacts at a bottom portion of the case and the second electrode tab is welded at the opening rim side opposite the bottom portion of the case.

18 Claims, 12 Drawing Sheets

(56) References Cited

U.S. PATENT DOCUMENTS

| | | |
|---|---|---|
| 2017/0047575 A1 | 2/2017 | Tsuji et al. |
| 2017/0069901 A1 | 3/2017 | Haraguchi et al. |
| 2017/0084901 A1* | 3/2017 | Doo .................... H01M 50/147 |
| 2018/0040881 A1* | 2/2018 | Kusagawa ............ H01M 4/131 |
| 2018/0323419 A1 | 11/2018 | Shiraga et al. |
| 2020/0321651 A1* | 10/2020 | Campbell ............. H01M 10/48 |
| 2020/0373626 A1* | 11/2020 | Imanishi ........... H01M 10/0525 |

FOREIGN PATENT DOCUMENTS

| | | |
|---|---|---|
| JP | 6147207 B | 6/2017 |
| WO | 2015/198526 | 12/2015 |
| WO | 2017/085918 | 5/2017 |
| WO | WO-2021153922 A1 * | 8/2021 |

* cited by examiner

CYLINDRICAL BATTERY AND METHOD OF MANUFACTURE THEREOF

TECHNICAL FIELD

The present disclosure relates to a cylindrical battery, and to a method for manufacturing same.

BACKGROUND

A battery is available in which an electrode tab leading out from the negative electrode plate of an electrode unit constructed as a roll of positive electrode plate, separator, and negative electrode plate is connected to a case. The electrode tab connected to the positive electrode plate is connected to a filter, and is in communication with the positive electrode. As an example, Japanese Patent Number 6147207 describes such a battery.

In the battery of this related art, two electrode tabs (leads) connected to a negative electrode plate are welded to the bottom center of the case at the same location.

SUMMARY

However, traditional cylindrical batteries lack durability against the impact caused by dropping, and require improved strength against rotational torque at the junction connecting the electrode unit to the case.

The present disclosure is intended to provide a solution to the foregoing problem, and an object of the present disclosure is to provide a cylindrical battery having improved strength against rotational torque, and a method for manufacturing such a cylindrical battery.

A cylindrical battery according to an aspect of the present disclosure comprises:

an electrode unit configured as a roll of a first electrode plate and a second electrode plate with a separator in between, the first electrode plate being an electrode plate to which one end of a first electrode tab and one end of a second electrode tab are connected, the second electrode plate being an electrode plate of opposite polarity from the first electrode plate;

a case housing the electrode unit; and a sealing member sealing an opening, rim of the case, the first electrode tab and the second electrode tab being disposed so as to project out from the first electrode plate at opposite ends of a winding axis of the first electrode plate, the first electrode tab being in contact with a bottom portion of the case by being welded thereto, the second electrode tab being welded at the opening rim side opposite the bottom portion of the case.

A method for manufacturing a cylindrical battery according to an aspect of the present disclosure comprises:

disposing a first electrode tab and a second electrode tab in such an orientation that the first electrode tab and the second electrode tab project out from a first electrode plate at opposite ends of a winding axis of the first electrode plate with one end of the first electrode tab and one of the second electrode tab being connected to the first electrode plate, and;

winding the first electrode plate and a second electrode plate of opposite polarity from the first electrode plate into a roll with a separator in between to make an electrode unit;

housing the electrode unit in a case;

contacting and welding the first electrode tab to a bottom portion of the case; and sealing an opening rim of the case with a sealing member, the second electrode tab being welded at the opening rim side of the case opposite the bottom portion of the case in sealing the opening rim of the case with the sealing member.

According to the aspects of the present disclosure, a cylindrical battery can be provided that has improved strength against the rotational torque of the electrode unit connected to the electrode tab attached to the bottom portion of the case. A method for manufacturing such a cylindrical battery also can be provided.

DESCRIPTION OF EMBODIMENTS

Figure 1A:
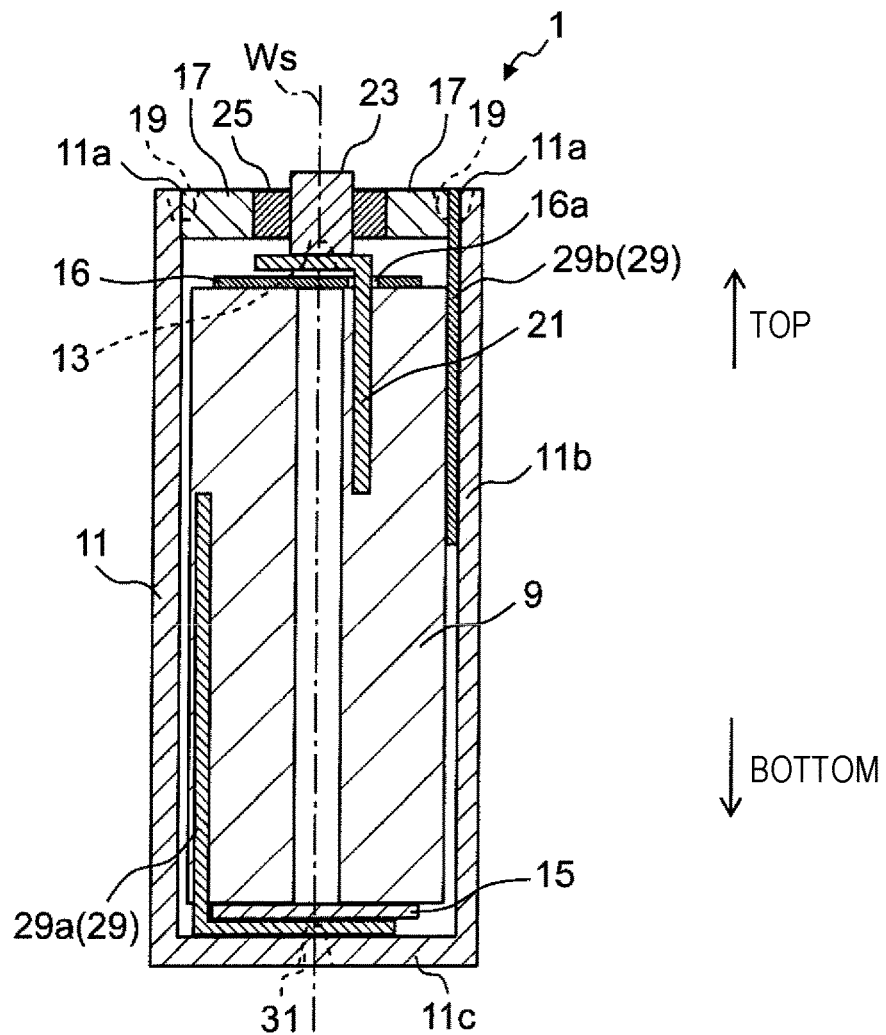
FIG. 1A is a longitudinal sectional view schematically representing a configuration of a battery of First Embodiment of the present disclosure.

According to an aspect of the present disclosure, there is provided a cylindrical battery that comprises:

an electrode unit configured as a roll of a first electrode plate and a second electrode plate with a separator in between, the first electrode plate being an electrode plate to which one end of a first electrode tab and one end of a second electrode tab are connected, the second electrode plate being an electrode plate of opposite polarity from the first electrode plate;

a case housing the electrode unit; and a sealing member sealing an opening rim of the case, the first electrode tab and the second electrode tab being disposed so as to project out from the first electrode plate at opposite ends of a winding axis of the first electrode plate, the first electrode tab being in contact with a bottom portion of the case by being welded thereto, the second electrode tab being welded at the opening rim side opposite the bottom portion of the case.

According to another aspect of the present disclosure, there is provided a method for manufacturing a cylindrical battery, the method comprising:

disposing a first electrode tab and a second electrode tab in such an orientation that the first electrode tab and the second electrode tab project out from a first electrode plate at opposite ends of a winding axis of the first electrode plate with one end of the first electrode tab and one end of the second electrode tab being connected to the first electrode plate;

winding the first electrode plate and a second electrode plate of opposite polarity from the first electrode plate into a roll with a separator in between to make an electrode unit;

housing the electrode unit in a case;

contacting and welding the first electrode tab to a bottom portion of the case; and sealing an opening rim of the case with a sealing member, the second electrode tab being welded at the opening rim side of the case opposite the bottom portion of the case in sealing the opening rim of the case with the sealing member.

Preferably, the second electrode tab is welded to the opening rim of the case.

Preferably, the second electrode tab is interposed and welded between the sealing member and the opening rim.

Preferably, the sealing member has a circumferential depression formed into the sealing member toward the center of the battery, and the second electrode tab is fitted into the depression of the sealing member.

Preferably, the second electrode tab comprises a plurality of second electrode tabs.

Preferably, the case has a side portion that is straight from the bottom portion to the opening rim as viewed in a longitudinal section.

Preferably the first electrode tab is bent along the bottom portion of the case.

Preferably, the first electrode plate is a negative electrode plate, and the second electrode plate is a positive electrode plate.

First Embodiment

First Embodiment of the present disclosure is described below, with reference to the accompanying drawings. It is to be noted that the present disclosure is not limited to the embodiments below. Various changes may be made to the extent that such changes do not depart from the scope that produces the effects of the present disclosure. Combinations with other embodiments are also possible.

Figure 1B:
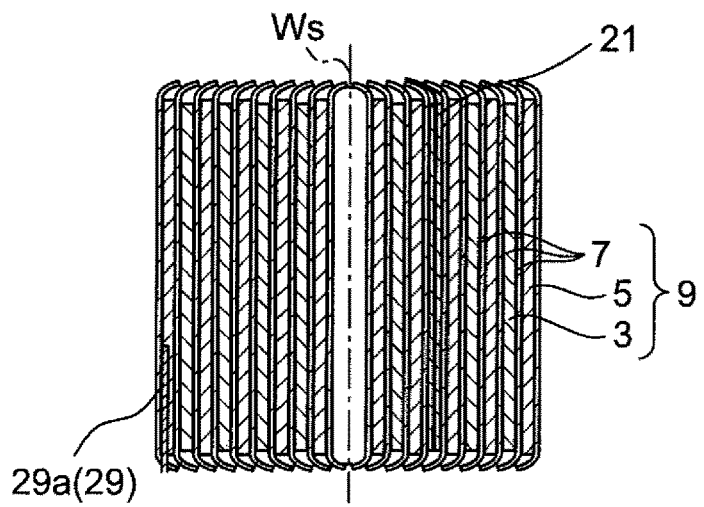
FIG. 1B is a longitudinal sectional view schematically representing an electrode unit of First. Embodiment of the present disclosure.

Referring to FIGS. 1A and 1B, FIG. 1A is a longitudinal sectional view schematically representing a configuration of a battery 1 of First Embodiment of the present disclosure. FIG. 1B is a longitudinal sectional view schematically representing an electrode unit 9. In the following descriptions, the bottom of a case 11 is on the side of a bottom portion 11c, and the side where a sealing member 17 is provided is the top of the case 11.

In the battery 1, the electrode unit 9 includes a first electrode plate 5 and a second electrode plate 3 that are rolled around a winding axis Ws with a separator 7 in between. The electrode unit 9 is housed inside the case 11 with an electrolytic solution. Here, the winding axis Ws of the electrode unit 9 also represents the winding axis of the first electrode plate 5 and the second electrode plate 3. In First Embodiment, for example, the first electrode plate 5 is a negative electrode plate, and the second electrode plate 3 is a positive electrode plate.

An insulating plate 15 is disposed at the bottom of the electrode unit 9. For example, the insulating plate 15 is circular in shape, and is sized to contact the bottom end portion at the outermost circumference of the electrode unit 9 wound into a roll. An insulating plate 16 is disposed at the top of the electrode unit 9. For example, the insulating plate 16 is circular in shape, and is sized to contact the top end portion at the outermost circumference of the electrode unit 9 wound into a roll. The insulating plate 16 has a hole portion 16a through which a third electrode tab 21 (described later) extends upward. The case 11 has an opening rim 11a, a side portion 11b, and the bottom portion 11c. The opening rim 11a of the case 11 is sealed with the sealing member 17.

In First Embodiment, the opening rim 11a of the case 11 represents a portion around the opening of the case 11, and includes, for example, an upper inner portion, an apex portion, and an upper outer portion of the case 11. The side portion 11b of the case 11 upwardly extends in a straight line from the bottom portion 11c toward the opening rim 11a, as viewed in a longitudinal section. The sealing member 17 is, for example, a plate-like metal member.

A plurality of electrode tabs 29 is, attached to one of the electrode plates of the electrode unit 9 (for example, to the first electrode plate 5 representing the negative electrode plate). The electrode tabs 29 include a first electrode tab 29a leading out toward the bottom portion 11c from the first electrode plate 5, and a second electrode tab 29b leading out toward the sealing member 17.

The first electrode tab 29a, extending toward the bottom portion 11c along the side portion 11b, is in contact with the bottom portion. 11c by being bent in the shape of the letter L. The second electrode tab 29b extends in a straight line toward the sealing member 17 along the side portion 11b.

The third electrode tab 21 is attached to the other electrode plate of the electrode unit 9 (for example, the second electrode plate 3 representing the positive electrode plate), and joins a second electrode terminal 23 via a junction 13. The second electrode terminal 23 is provided as a single unit with the sealing member 17 via an insulator 25. The insulator 25 is circular in shape, and is fitted into the hole formed at the center of the sealing member 17. The second electrode terminal 23 is fitted into the hole formed at the center of the insulator 25. The insulator 25 can have a small size because it is disposed only around the second electrode terminal 23. This enables size reduction of the second electrode terminal 23, and the insulation performance can improve.

The third electrode tab 21 leading out from the second electrode plate 3 is joined to the second electrode terminal 23 at the junction 13, using a laser. The first electrode tab 29a leading out toward the bottom portion 11c of the case 11 from the first electrode plate 5 is joined to the case 11 at a junction 31, using a laser. The second electrode tab 29b leading out toward the sealing member 17 from the first electrode plate 5 is joined to the sealing member 17 and to the opening rim 11a of the case 11 using a laser, forming a junction 19 where these three members join upon melting.

Because the sealing member 17 is in communication with the first electrode plate 5, the sealing member 17 becomes a negative electrode region, for example. This enables the negative electrode to be connected to an external connection terminal over a wider area.

Figure 2A:
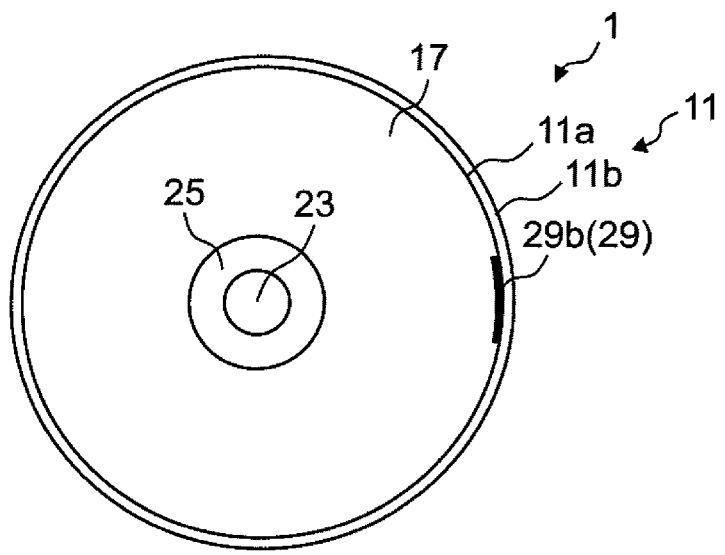
FIG. 2A is a plan view of the battery of First Embodiment of the present disclosure as viewed from above.
Figure 2B:
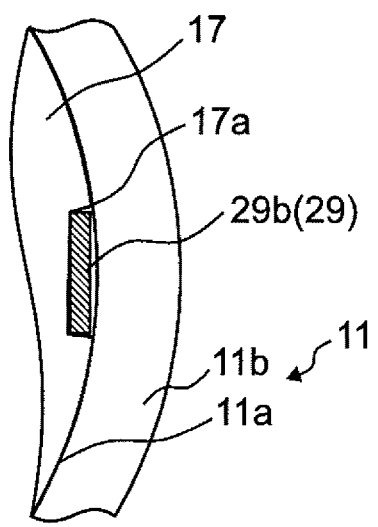
FIG. 2B is a partially enlarged view around the second electrode tab shown in FIG. 2A.

The following describes the positional relationship between the sealing member 17, the second electrode tab 29b, and the case 11 at the junction of these members, with reference to FIGS. 2A and 2B. FIG. 2A is a plan view of the battery 1 as viewed from above. FIG. 2B is a partially enlarged view around the second electrode tab 29b shown in FIG. 2A.

The sealing member 17 has a depression 17a, which is a circumferential recess formed into the sealing member 17 toward the center. The depth of the depression 17a is equal or substantially equal in length to the thickness of the second electrode tab 29b. The second electrode tab 29b, upon being fitted into the depression 17a of the sealing member 17, allows the sealing member 17 to contact the side portion 11b of the case 11 throughout its circumference except at the depression 17a.

Figure 3:
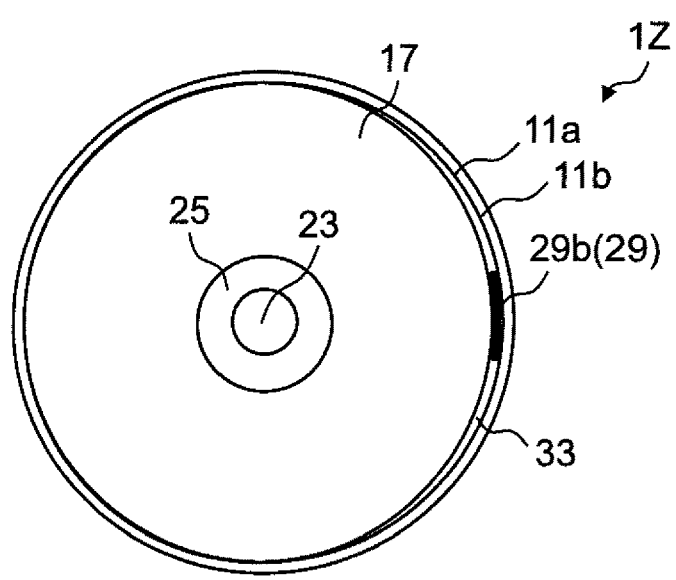
FIG. 3 is a plan view of a battery of a comparative example as viewed from above.

FIG. 3 is a plan view of the sealing member 17 without the depression 17a, as viewed into a battery 1Z from above. In the battery 1Z shown in FIG. 3, a gap 33, equal in thickness to the second electrode tab 29b, occurs between the sealing member 17 and opening rim 11a of the case 11. The gap 33 may cause welding defects, such as incomplete welding and welding holes, in laser welding of the sealing member 17 and the case 11. However, with the circumferential depression 17a cut in the sealing member 17 over a distance equal to the thickness of the second electrode tab 29b as in the battery 1, such gap 33 becomes smaller, and welding can be stably carried out with fewer defects.

Figure 4:
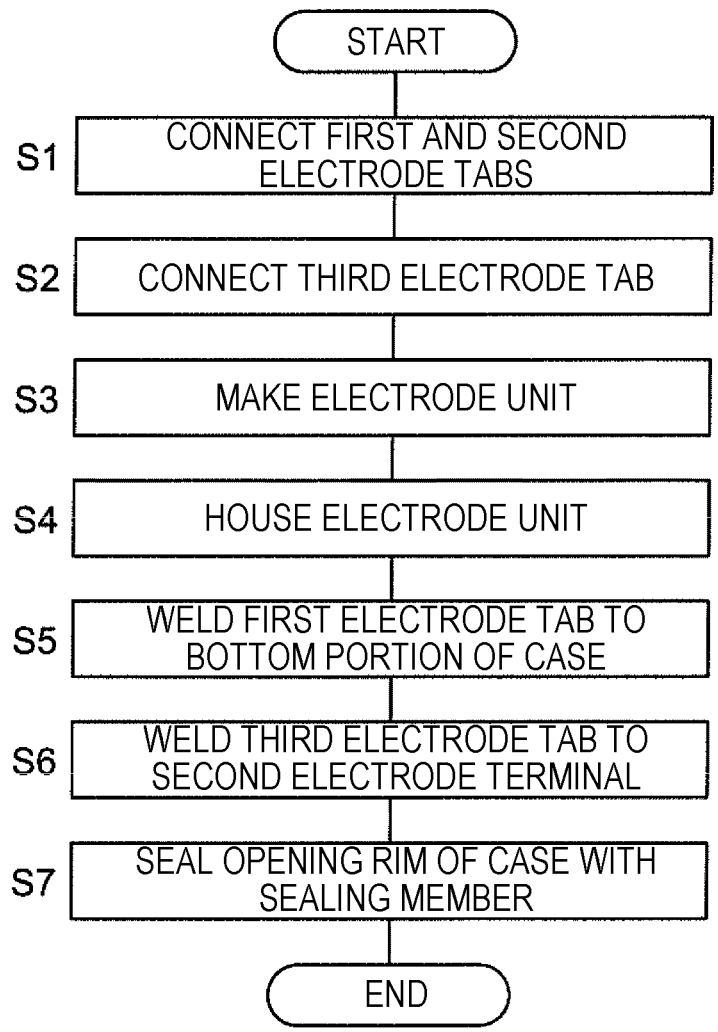
FIG. 4 is a flowchart representing the procedures of a battery manufacturing method of First Embodiment of the present disclosure.

A method of manufacture of the battery 1 is described below, with reference to FIG. 4. FIG. 4 is a flowchart representing the procedures of making the battery 1 of First Embodiment.

Figure 5:
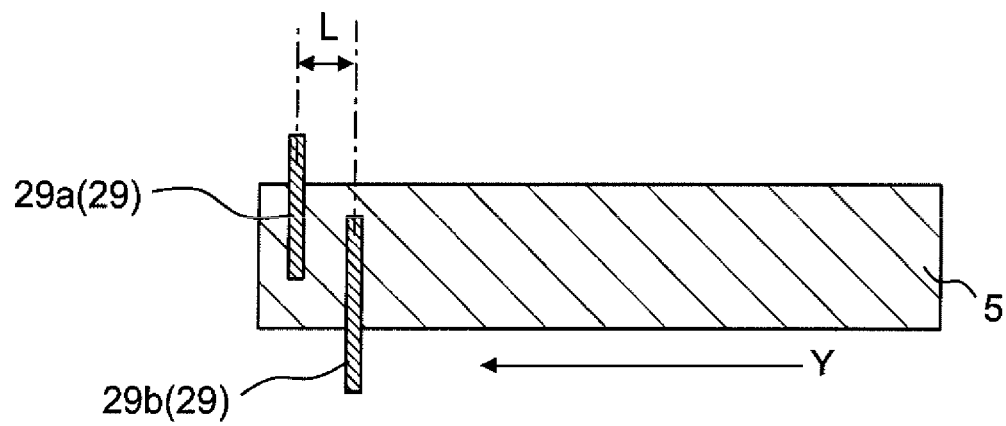
FIG. 5 is a plan view of a second electrode plate with two electrode tabs attached thereto.

In step S1, the first electrode tab 29a and the second electrode tab 29b are connected to the first electrode plate 5. Specifically, the first electrode tab 29a and the second electrode tab 29b are laid out to extend in opposite directions along the winding axis Ws of the first electrode plate 5 with one end of the first electrode tab 29a and one end of the second electrode tab 29b being connected to predetermined positions of the first electrode plate 5. For example, one end of the first electrode tab 29a is connected to the first electrode plate 5 as shown in FIG. 5. The second electrode tab 29b, extending in the opposite direction from the direction of extension of the first electrode tab 29a, is connected at one end to a position distance away from the first electrode tab 29a by distance L. For example, the first electrode tab 29a and the second electrode tab 29b are welded to the first electrode plate 5 by ultrasonic welding. In step S2, one end of the third electrode tab 21 is connected to the second electrode plate 3.

In step S3, the electrode and the second electrode plate 3 of opposite polarity from the first electrode plate 5 are rolled in a direction of arrow Y with the separator 7 in between to make the electrode unit 9, using a winder. After being rolled, the first electrode tab 29a and the second electrode tab 29b are on the outer circumference side of the electrode unit 9.

Figure 6A:
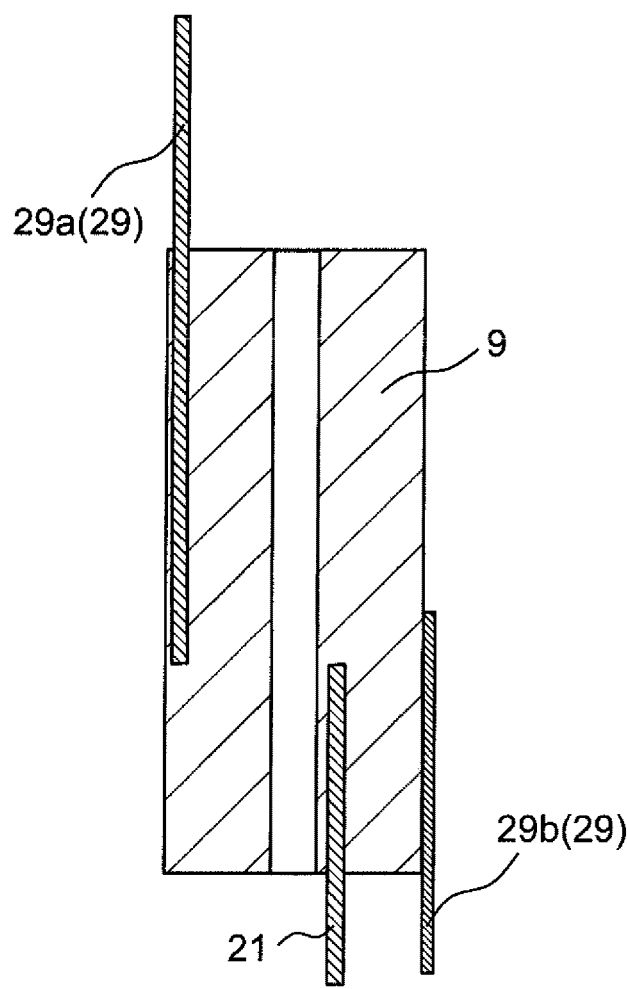
FIG. 6A is an explanatory diagram representing the battery manufacturing method of First Embodiment of the present disclosure.

In First Embodiment, as shown in FIG. 6A, the distance L between the first electrode tab 29a and the second electrode tab 29b on the first electrode plate 5 is set so that the first electrode tab 29a and the second electrode tab 29b are on the opposite sides of the electrode unit 9 upon being rolled. With the plurality of electrode tabs 29 connected to the first electrode plate 5, the battery 1 can have reduced internal electrical resistance, and the rapid charge and discharge performance can improve.

The following describes the procedures after the completion of the electrode unit 9, from bending of the electrode tabs 29 to laser welding to the case 11.

As shown in FIG. 6A, the first electrode tab 29a and the second electrode tab 29b stick out of the electrode unit 9. In First Embodiment, the first electrode tab 29a and the second electrode tab 29b are opposite each other relative to the rolling direction (rotational direction).

Figure 6B:
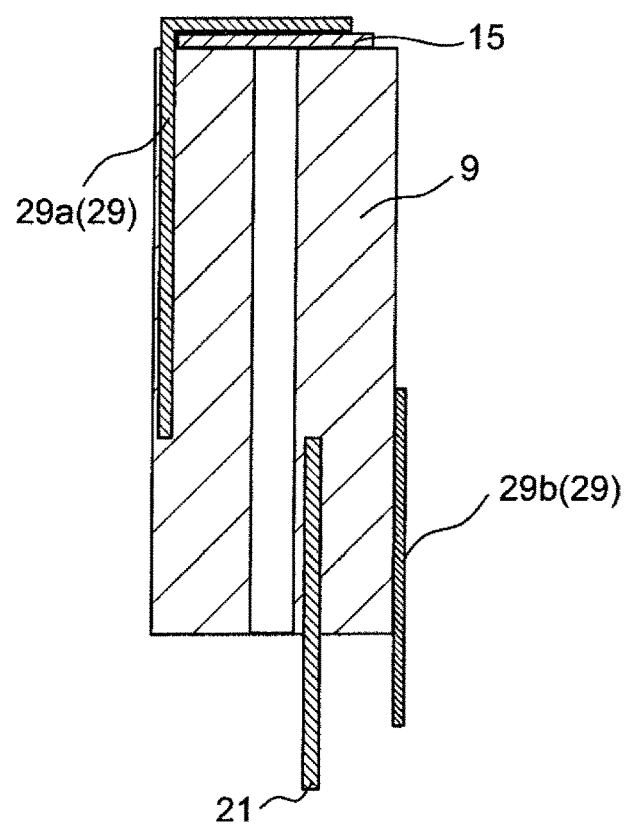
FIG. 6B is an explanatory diagram representing the battery manufacturing method of First Embodiment of the present disclosure.

As shown in FIG. 6B, the insulating plate 15, disk-like in shape, is disposed at the end of the electrode unit 9, on the side of the first electrode tab 29a projecting out of the electrode unit 9. The first electrode tab 29a is then bent along the surface of the insulating plate 15 at the outer edge of the insulating plate 15, radially toward the center of the electrode unit 9.

Figure 6C:
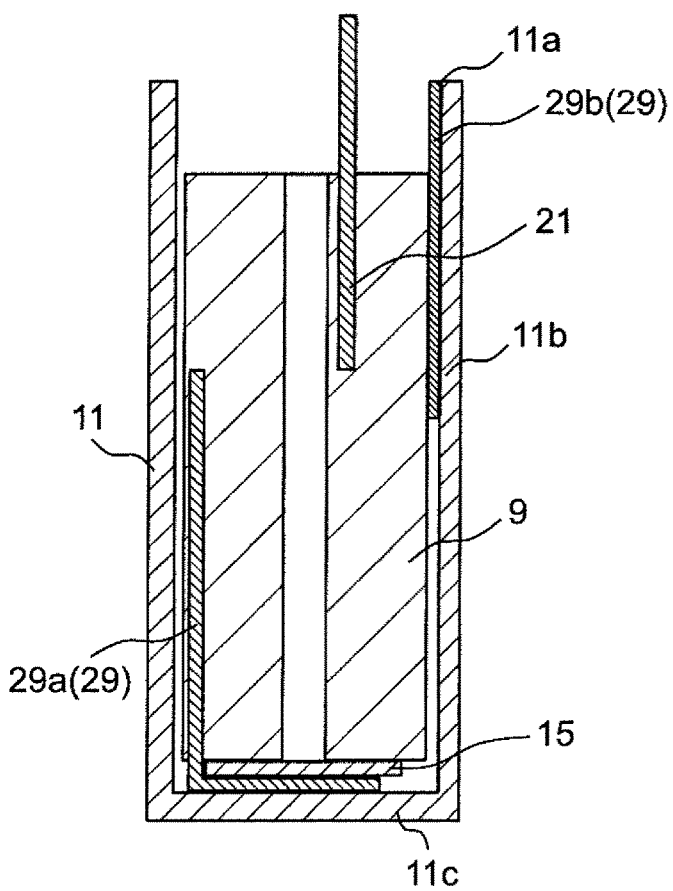
FIG. 6C is an explanatory diagram representing the battery manufacturing method of First Embodiment of the present disclosure.

In step S4, the electrode unit 9 is flipped upside down, and inserted into the case 11 in such an orientation that the first electrode tab 29a is on the bottom side, as shown in FIG. 6C. This completes the procedure that houses the electrode unit 9 inside the case 11.

Figure 6D:
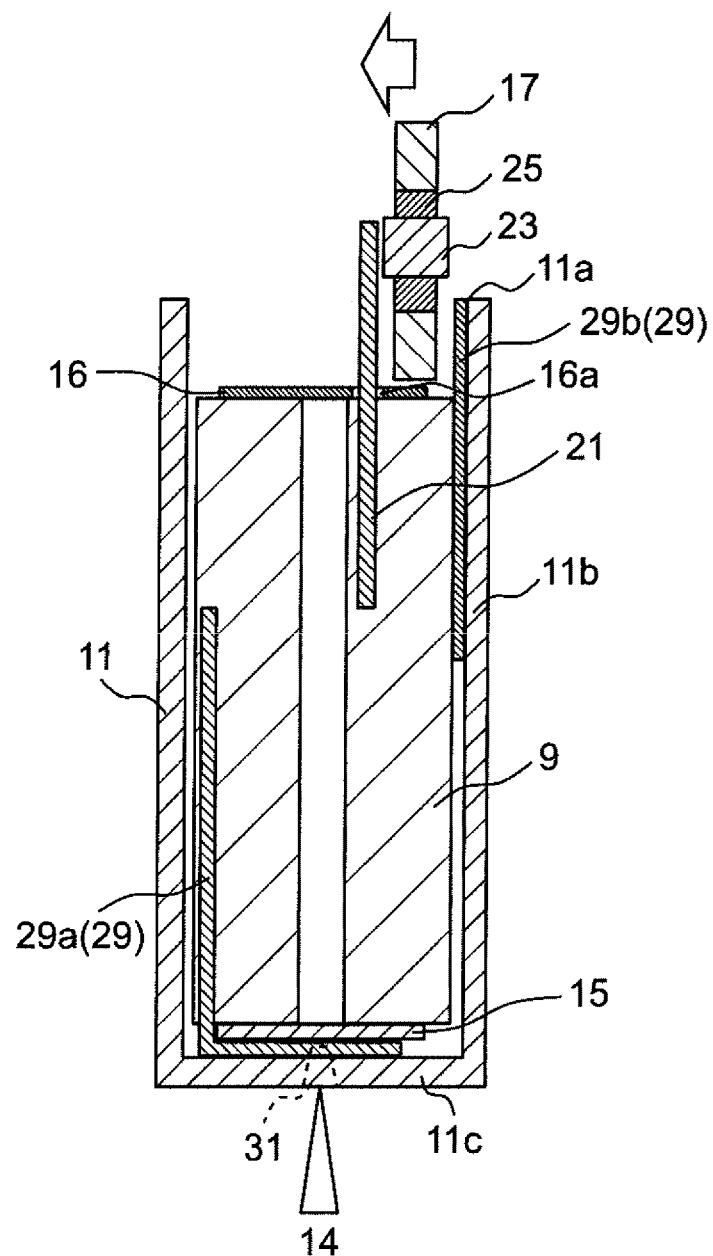
FIG. 6D is an explanatory diagram representing the battery manufacturing method of First Embodiment of the present disclosure.

In step S5, as shown in FIG. 6D, a laser beam 14 is applied from the bottom side of the case 11 (from the lower side in the figure) to simultaneously weld the bottom portion 11c of the case 11 and the first electrode tab 29a. Here, the first electrode tab 29a is welded to the case 11 in a non-penetrating fashion so as to avoid entry of sputtered metal into the case 11 at the time of melting.

The insulating plate 16, disk-like in shape, is disposed at the end of the electrode unit 9, on the side of the third electrode tab 21 projecting out of the electrode unit 9. The third electrode tab disposed through the hole portion 16a of the insulating plate 6.

In step S6, the second electrode terminal 23 of the sealing member 17, and the third electrode tab 21 are welded to each other using a laser, outside of the case 11. After being welded, the third electrode tab 21 is bent, and the sealing member 17 is fitted to the opening rim 11a of the case 11 to seal the case 11. Here, it is desirable to inject an electrolytic solution before sealing the case 11. However, an electrolytic solution may be injected after sealing the case 11, such as when the sealing member 17 has a hole for injecting an electrolytic solution.

Figure 6E:
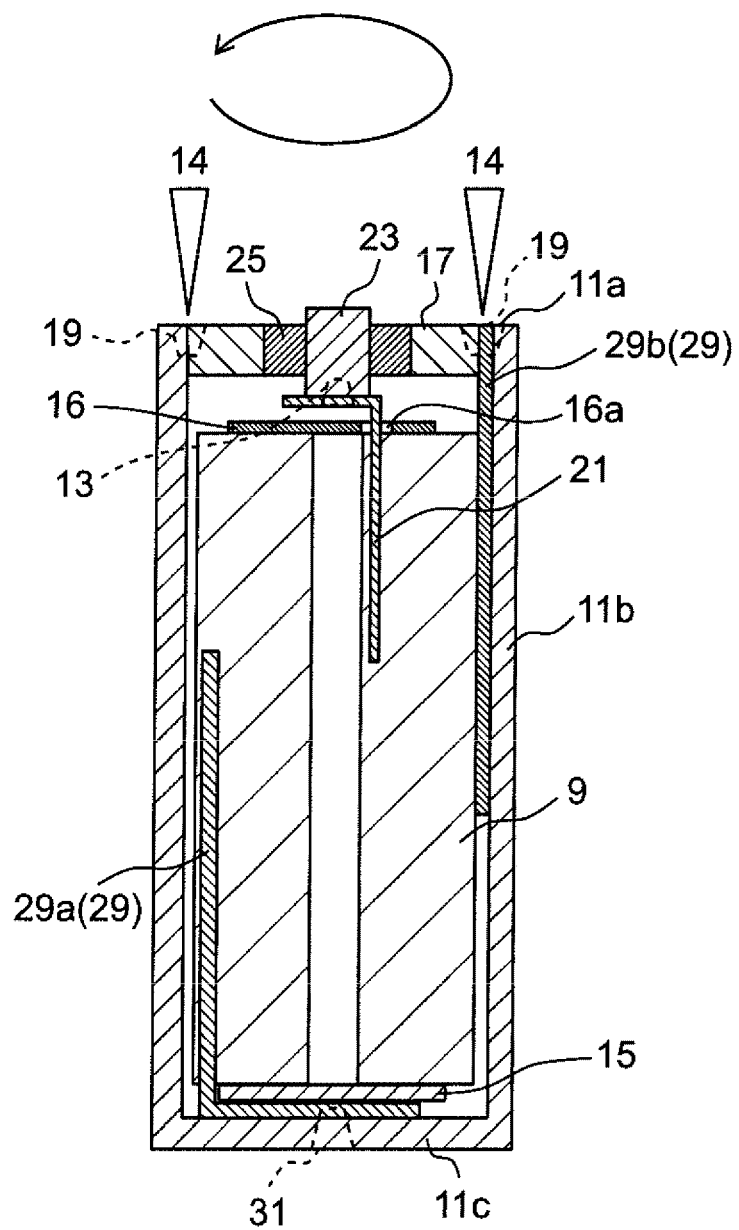
FIG. 6E is an explanatory diagram representing the battery manufacturing method of First Embodiment of the present disclosure.

In step S7, as shown in FIG. 6E, a laser beam 14 is applied along the outer circumference of the sealing member 17 to weld the opening rim 11a of the case 11, the second electrode tab 29b, and the sealing member 17, all at the same time. This completes the sealing of the opening rim 11a of the case 11 with the sealing member 17.

The battery 1 manufactured by the method of First Embodiment has improved strength against rotational torque, for example, even against a heavy load of a reliability test (such as in a drop test or a vibration test), preventing detachment of the electrode tabs 29.

As described above, the cylindrical battery 1 according to First Embodiment includes the electrode unit 9 configured as a roll of the first electrode plate 5 and the second electrode plate 3 with the separator 7 in between, the first electrode plate 5 being an electrode plate to which one end of the first electrode tab 29a and one end of the second electrode tab 29b are connected, the second electrode plate 3 being an electrode plate of opposite polarity from the first electrode plate 5. The battery 1 also includes the case 11 housing the electrode unit 9, and the sealing member 17 sealing the opening rim 11a of the case 11. The first electrode tab 29a and the second electrode tab 29b are disposed so as to project out from the first electrode plate 5 at the opposite ends of the winding axis Ws of the first electrode plate 5. The first electrode tab 29a is in contact with the bottom portion 11c of the case 11 by being welded thereto. The second electrode tab 29b is welded at the opening rim 11a side opposite the bottom portion 11c of the case 11.

The method for manufacturing the cylindrical battery 1 according to First Embodiment includes:

disposing the first electrode an 29a and the second electrode tab 29b in such an or that the first electrode tab 29a and the second electrode tab 29b project out from the first electrode plate 5 at the opposite ends of the winding axis Ws of the first electrode plate 5 with one end of the first electrode tab 29a and one end of the second electrode tab 29b being connected to the first electrode plate 5 (step S1).

The method for manufacturing the battery 1 also includes:

winding the first electrode plate 5 and the second electrode plate 3 of opposite polarity from the first electrode plate 5 into a roll with the separator 7 in between to make the electrode unit 9 (step S3);

housing the electrode unit 9 in the case 11 (step S4); and contacting and welding the first electro e tab 29a to the bottom portion 11c of the case 11 (step S5).

The method for manufacturing battery 1 also includes sealing the opening rim of the case 11 with the sealing member 17 (step S6). In the sealing step using the sealing member 17 (step S6), the second electrode tab 29b is welded at the rim 11a side of the case 11 opposite the bottom portion 11c of the case 11.

As described above, the cylindrical battery 1, and the method for manufacturing the battery 1 of First Embodiment include the second electrode tab 29b that extends toward the sealing member 17 from the first electrode plate 5, in addition to the first electrode tab 29a that extends toward the bottom portion 11c of the case 11 from the first electrode plate 5. The two electrode tabs 29 extending from the first electrode plate 5 and attached to the sealing member 17 and the case 11 mean that the first and second electrode tabs 29a and 29b are attached to different parts of battery, and the strength against rotational torque can improve. With the second electrode tab 29b attached between the sealing member 17 and the case 11, the strength against rotational torque can further improve.

The second electrode tab 29b is welded to the opening rim 11a of the case 11. Because the second electrode tab 29b is welded to the opening rim 11a of the case 11, welding of the second electrode tab 29b can be achieved with ease.

The second electrode tab 29b is interposed and welded between the sealing member 17 and the opening rim 11a. That is, the sealing member 17 is in communication with the second electrode tab 29b, and can serve as a polar region of the second electrode tab 29b.

The sealing member 17 has the depression 17a, a circumferential recess formed into the sealing member 17 toward the center, and the second electrode tab 29b is fitted into the depression. 17a of the sealing member 17. In this way, the gap between the sealing member 17 and the case 11 can be made smaller, and the sealing member 17 and the case 11 can be welded to each other with fewer defects. The rotational alignment of the sealing member 17 at the outer circumference also becomes easier.

The case 11 is shaped so that the side portion 11b of the case 11 is straight from the bottom portion 11c to the opening rim 11a, as viewed in a longitudinal section. Unlike the related art, this eliminates the need to inwardly swage the case 11, making it possible to reduce the number of manufacturing steps, and to increase the inner volume. Because the case 11 can be bent with ease, it is possible to use a stainless steel material for the case 11.

The first electrode tab 29a is bent along the bottom portion 11c of the case 11. In this way, the first electrode tab 29a can be disposed at the center of the battery 1. This eliminates the need to circumferentially align the first electrode tab 29a when welding the first electrode tab 29a to the case 11, making it easier to weld the first electrode tab 29a at the center of the bottom portion 11c of the case 11.

Second Embodiment

Figure 7:
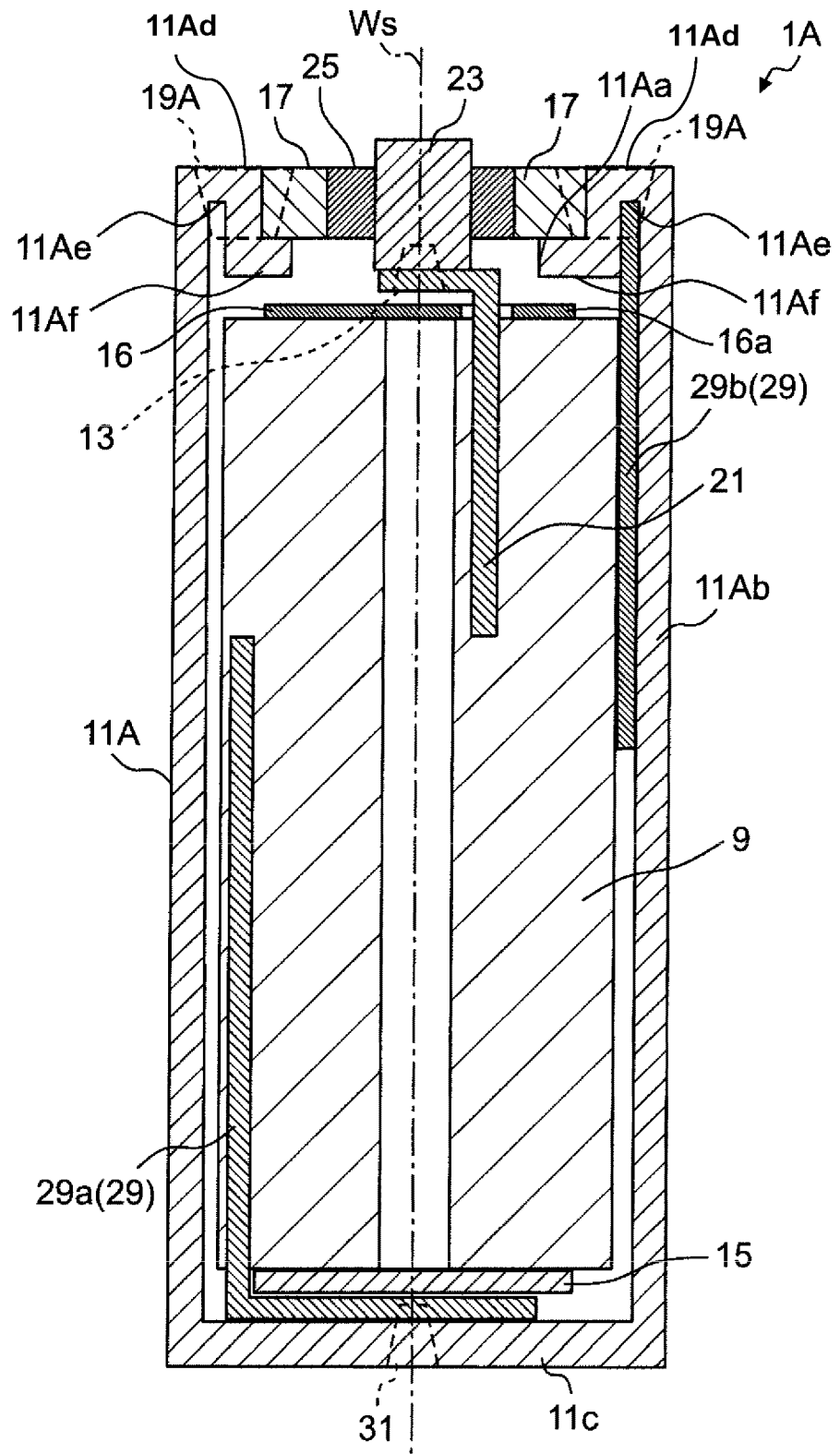
FIG. 7 is a longitudinal sectional view schematically representing a configuration of a battery of Second Embodiment of the present disclosure.

The following describes a battery 1A of Second Embodiment, with reference to FIG. 7. FIG. 7 is a longitudinal sectional view schematically representing a configuration of a batter y 1A of Second Embodiment of the present disclosure. For clarity, FIG. 7 shows a junction 19A in broken lines to indicate the portion where a second electrode tab 29b, a sealing member 17, and an apex portion 11Ad of a case 11A are joined to one another using a laser.

The battery LA of Second Embodiment differs from the configuration of the battery 1 of First Embodiment of FIG. 1 in that the sealing member 17 and the second electrode tab 29b are welded to a folded-back portion 11Ae of a side portion 11Ab of the case 11A. Second Embodiment does not differ from First Embodiment except for this point and the features described below.

Specifically, the side portion 11Ab of the case 11A has the folded-back portion 11Ae, which is a portion of the case 11A turned back toward the bottom portion 11c in the shape of an inverted U at an apex portion 11Ad. The side portion 11Ab also has an extension portion 11Af extending from the folded-back portion 11Ae by being folded radially inward toward the center of the case 11A. The end of the extension portion 11Af forms an opening rim 11Aa. That is, in Second Embodiment, the sealing member 17 is mountable on the extension portion 11Af. This improves the alignment accuracy of the sealing member 17, and makes the welding procedure easier.

Third Embodiment

Figure 8A:
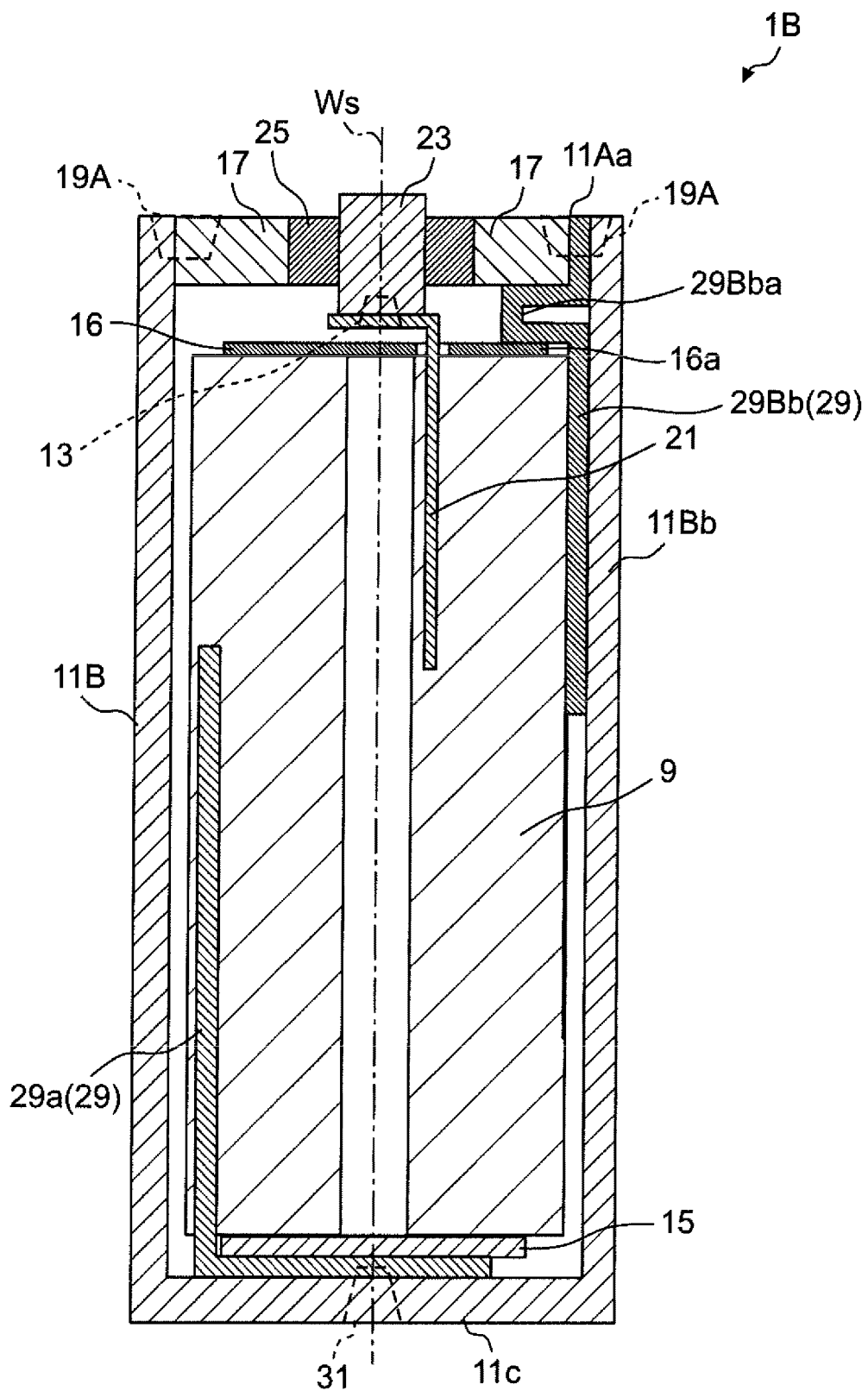
FIG. 8A is a longitudinal sectional view schematically representing a configuration of a battery of Third Embodiment of the present disclosure.

A battery of Third Embodiment is described below with reference to FIG. 8A. FIG. 8A is a longitudinal sectional view schematically representing a configuration of a battery 1B of Third Embodiment of the present disclosure. Third Embodiment differs from the configuration of the battery 1 of First Embodiment of FIG. 1 in that the battery 1B of Third Embodiment has a folded-back portion 29Bba, which is a portion of second electrode tab 29Bb inwardly projecting out in the shape of the letter U turned sideways. Third Embodiment does not differ from First Embodiment except for this point and the features described below.

With the folded-back portion 29Bba, the second electrode tab 29Bb of Third Embodiment has a portion that radially extends toward the center of the electrode unit 9. The folded-back portion 29Bba of the second electrode tab 29Bb allows the sealing member 17 to be partly mounted thereon, making it easier to align the sealing member 17.

Figure 8B:
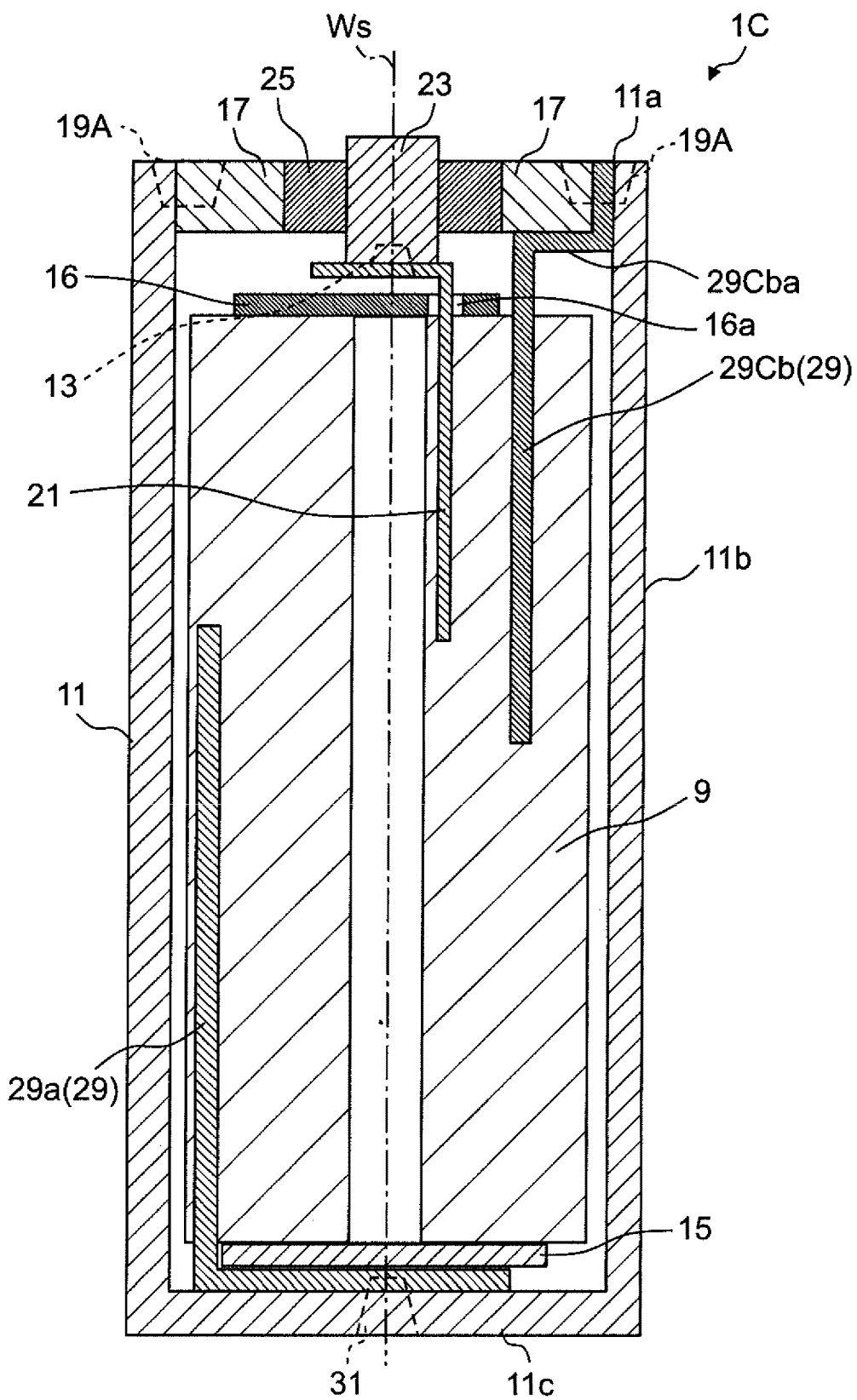
FIG. 8B is a longitudinal sectional view schematically representing a configuration of a battery of a variation of Third Embodiment of the present disclosure.

The second electrode tab 29Bb may have the shape shown in FIG. 8B. Specifically, a battery 1C may have a second electrode tab 29Cb that has an extension portion 29Cba extending out of the electrode unit 9 and folded to radially extend out away from the center of the electrode unit 9. The second electrode tab 29Cb further extends in a direction away from the bottom port on 11c at the outer edge of the extension portion 29Cba. With this configuration, the extension portion 29Cba of the second electrode tab 29Cb allows the sealing member 17 to be partly mounted thereon as with the case of the second electrode tab 29Bb, making it easier to align the seal ng member 17.

Figure 9:
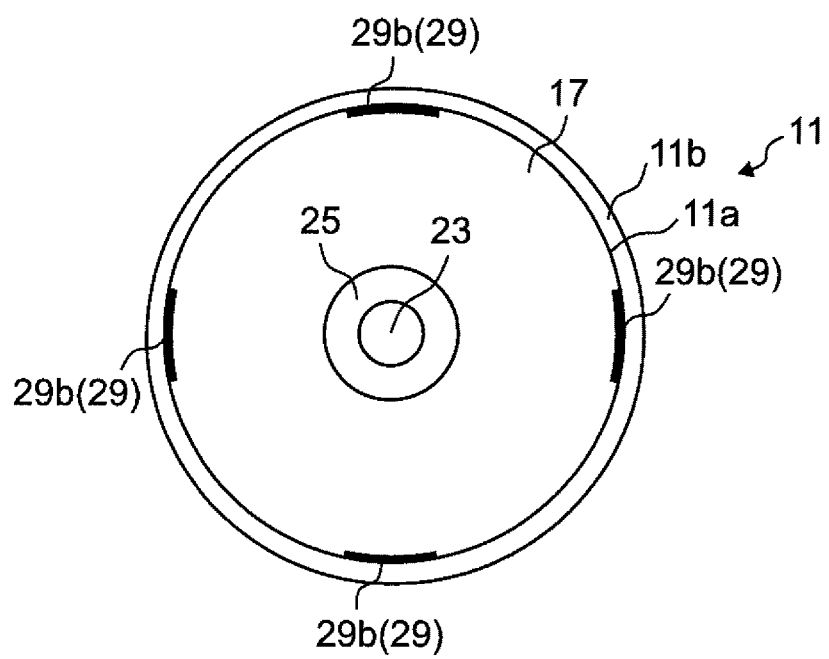
FIG. 9 is a plan view of a battery of a variation of the present disclosure as viewed from above.

The embodiments of the present disclosure have been described through the case of the electrode tabs 29 configured from the first electrode tab 29a and the second electrode tab 29b. However, a configuration including three or more electrode tabs is also effective. FIG. 9 is a plan view of a battery of a variation of the present disclosure, as viewed from above. As an example, a plurality of second electrode tabs 29b may be disposed along the outer circumference at 90° intervals, as shown in FIG. 9. In this fashion, as many second electrode tabs 29 may be provided around the sealing member 17 as the circumferential length allows. Increasing the number of second electrode tabs 29 increases the magnitude of current that can be passed. As in this example, it is preferable that the battery include a plurality of second electrode tabs 29b disposed at regular intervals as viewed from above. In this way, the center of gravity of the second electrode tabs 29b can move closer to the center of battery, allowing the electrode unit 9 to balance itself. The third electrode tab 21 is attached to the second electrode plate 3 in a position slightly off the center of battery, and it is preferable to dispose the third electrode tab 21 and the second electrode tabs 29b in such positions that the combined center of gravity is closer to the center of battery.

As described above, the cylindrical battery 1 includes a plurality of second electrode tabs 29b. With a plurality of electrode tabs connected between the case 11 and the first electrode plate 5, a large current can be passed to enable rapidly charge and discharge.

In the embodiments of the present disclosure, the main material of the electrode tabs 29 is nickel, copper, or a clad material of copper and nickel. Specifically, the first electrode tab 29a and the second electrode tab 29b pass large current in automotive batteries, and a clad material of copper and nickel is widely used in these applications. Nickel tabs have high electrical resistance, and fuse upon passing large current. In copper tabs, the base, material copper itself is weak, and the material breaks apart under an applied mechanical load. In the context of laser welding, copper has low absorbance (high reflectance) against the laser wavelength. Nickel, on the other hand, has high absorbance (low reflectance). From a metallurgical perspective, nickel is therefore more easily meltable than copper.

The present disclosure is not limited to the foregoing embodiments, and may be modified as follows.

(1) The foregoing embodiments are based on a sealed battery. However, the battery is not limited to this, and may be an open-type battery. The type of sealed battery to which the present disclosure is applicable is not particularly limited, and may be a lithium-ion secondary battery, a nickel-metal hydride battery, or a nickel-cadmium battery. The present disclosure is not limited to secondary batteries, and is also applicable to primary batteries.

(2) The foregoing embodiments were described through the case where the first electrode plate 5 is the negative electrode plate, and the second electrode plate 3 is the positive electrode plate. However, the present disclosure is not limited to this, and the first electrode plate 5 may be the positive electrode plate, and the second electrode plate 3 may be the negative electrode plate.

(3) The laser welding of components such as at the junctions 13, 19, 19A, and 31 carried out in the foregoing embodiments may be replaced with other common bonding techniques. However, in order to prevent entry of impurities into the battery, it is preferable to use a metallurgical bonding technique, for example, such as resistance welding or ultrasonic welding.

The battery and the battery manufacturing method of the present disclosure are applicable to secondary batteries and primary batteries.

What is claimed is:

1. A cylindrical battery comprising:
an electrode unit configured as a roll of a first electrode plate and a second electrode plate with a separator in between, the first electrode plate being an electrode plate to which one end of a first electrode tab and one end of a second electrode tab are connected, the second electrode plate being an electrode plate of opposite polarity from the first electrode plate;
a cylindrical case housing the electrode unit; and
a sealing member sealing an opening rim of the cylindrical case,
wherein the first electrode tab and the second electrode tab are disposed so as to project out from the first electrode plate at opposite ends of a winding axis of the first electrode plate,
the first electrode tab disposed at the first electrode plate is in contact with a bottom portion of the cylindrical case by being welded thereto, and
the second electrode tab disposed at the first electrode plate is welded at a side of the opening rim opposite to the bottom portion of the cylindrical case.

2. The cylindrical battery according to claim 1, wherein the second electrode tab is welded to the opening rim of the cylindrical case.

3. The cylindrical battery according to claim 2, wherein the second electrode tab is interposed and welded between the sealing member and the opening rim.

4. The cylindrical battery according to claim 3, wherein the sealing member has a circumferential depression formed into the sealing member toward a center of the battery, and the second electrode tab is fitted into the circumferential depression of the sealing member.

5. The cylindrical battery according to claim 1, wherein the second electrode tab comprises a plurality of second electrode tabs.

6. The cylindrical battery according to claim 1, wherein the cylindrical case has a side portion that is straight from the bottom portion to the opening rim as viewed in a longitudinal section.

7. The cylindrical battery according to claim 1, wherein the first electrode tab is bent along the bottom portion of the cylindrical case.

8. The cylindrical battery according to claim 1, wherein the first electrode plate is a negative electrode plate, and the second electrode plate is a positive electrode plate.

9. A method for manufacturing a cylindrical battery, the method comprising:
disposing a first electrode tab and a second electrode tab in such an orientation that the first electrode tab and the second electrode tab project out from a first electrode plate at opposite ends of a winding axis of the first electrode plate with one end of the first electrode tab and one end of the second electrode tab being connected to the first electrode plate;
winding the first electrode plate and a second electrode plate of opposite polarity from the first electrode plate into a roll with a separator in between to make an electrode unit;
housing the electrode unit in a cylindrical case;

contacting and welding the first electrode tab disposed at the first electrode plate to a bottom portion of the cylindrical case; and sealing an opening rim of the cylindrical case with a sealing member, wherein the second electrode tab disposed at the first electrode plate is welded at a side of the opening rim of the cylindrical case opposite the bottom portion of the cylindrical case in the sealing of the opening rim of the cylindrical case with the sealing member.

10. The method according to claim 9, wherein the second electrode tab is welded to the opening rim of the cylindrical case.

11. The method according to claim 10, wherein the second electrode tab is interposed and welded between the sealing member and the opening rim.

12. The method according to claim 11, wherein the sealing member has a circumferential depression formed into the sealing member toward the center of the battery, and the second electrode tab is fitted into the circumferential depression of the sealing member.

13. The method according to claim 9, wherein the second electrode tab comprises a plurality of second electrode tabs.

14. The method according to claim 9, wherein the cylindrical case has a side portion that is straight from the bottom portion to the opening rim as viewed in a longitudinal section.

15. The method according to claim 9, wherein the first electrode tab is bent along the bottom portion of the cylindrical case.

16. A cylindrical battery comprising:

an electrode unit including a roll of a first electrode plate and a second electrode plate with a separator in between, the second electrode plate having opposite polarity from the first electrode plate, one end of a first electrode tab connected to the first electrode plate, and one end of a second electrode tab connected to the first electrode plate;

a case housing the electrode unit; and a sealing member sealing an opening rim of the case, the sealing member including a circumferential depression toward a center of the battery, wherein the first electrode tab and the second electrode tab project out from the first electrode plate at opposite ends of a winding axis of the first electrode plate, the first electrode tab is welded to a bottom portion of the case, and the second electrode tab is welded at a side of the opening rim opposite to the bottom portion of the case and fitted into the circumferential depression of the sealing member.

17. The cylindrical battery according to claim 1, wherein the sealing member is a separate component from the cylindrical case prior to sealing, and the cylindrical case and the sealing member are in direct contact after sealing.

18. The method according to claim 9, wherein the sealing member is a separate component from the cylindrical case prior to sealing, and the cylindrical case and the sealing member are in direct contact after sealing.

* * * * *